United States Patent
Maruyama

(10) Patent No.: US 11,508,186 B2
(45) Date of Patent: Nov. 22, 2022

(54) SMILE DEGREE DETECTION DEVICE, METHOD, RECORDING MEDIUM, AND CAMERA SYSTEM

(71) Applicant: PATIC TRUST CO., LTD., Kofu (JP)

(72) Inventor: Tetsuo Maruyama, Kofu (JP)

(73) Assignee: PATIC TRUST CO., LTD., Kofu (JP)

( * ) Notice: Subject to any disclaimer, the term of this patent is extended or adjusted under 35 U.S.C. 154(b) by 0 days.

(21) Appl. No.: 17/607,719

(22) PCT Filed: Nov. 13, 2020

(86) PCT No.: PCT/JP2020/042498
§ 371 (c)(1),
(2) Date: Oct. 29, 2021

(87) PCT Pub. No.: WO2021/095869
PCT Pub. Date: May 20, 2021

(65) Prior Publication Data
US 2022/0270405 A1    Aug. 25, 2022

(30) Foreign Application Priority Data
Nov. 15, 2019   (JP) .............................. JP2019-207469

(51) Int. Cl.
*G06V 40/16*    (2022.01)
*G06V 20/52*    (2022.01)

(52) U.S. Cl.
CPC ............ *G06V 40/176* (2022.01); *G06V 20/52* (2022.01); *G06V 40/166* (2022.01)

(58) Field of Classification Search
CPC ..... G06V 40/176; G06V 20/52; G06V 40/166
(Continued)

(56) References Cited

U.S. PATENT DOCUMENTS

2014/0198234 A1* 7/2014 Kobayashi ......... H04N 1/00336
                                                          348/231.99
2015/0193718 A1    7/2015 Shaburov et al.
(Continued)

FOREIGN PATENT DOCUMENTS

JP    2001-300099 A    10/2001
JP    2003-187229 A    7/2003
(Continued)

OTHER PUBLICATIONS

English-language translation of the Written Opinion of the International Searching Authority dated Jan. 19, 2021, in corresponding International Application No. PCT/JP2020/042498; 4 pages.
(Continued)

*Primary Examiner* — Kenny A Cese
(74) *Attorney, Agent, or Firm* — Maier & Maier, PLLC

(57) ABSTRACT

An information processing device includes: a distinction unit that distinguishes a captured person on a basis of feature information of the captured person, on a basis of staff registration information containing feature information of staff members, and on a basis of customer registration information containing feature information of customers, the person captured by a camera; a staff-smile determination unit that determines, if one staff member of the staff members is distinguished as corresponding to the captured person, whether the one staff member corresponding to the captured person has smiled on a basis of a smile index of the captured person; a staff-smile counting unit that counts by which the staff members are determined to have smiled in a preset time period; a customer-revisit detection unit that detects that one customer of the customers has revisited; and a customer-revisit counting unit.

9 Claims, 10 Drawing Sheets

(58) Field of Classification Search
USPC .......................................................... 382/103
See application file for complete search history.

(56) References Cited

U.S. PATENT DOCUMENTS

| | | | | |
|---|---|---|---|---|
| 2016/0127657 A1* | 5/2016 | Mukai | .................... | G06V 20/52 |
| | | | | 348/218.1 |
| 2018/0293612 A1* | 10/2018 | Yuasa | ...................... | G07G 1/01 |
| 2018/0349818 A1* | 12/2018 | Chan | .................. | G06Q 10/0639 |
| 2019/0180455 A1* | 6/2019 | Yamaura | ................. | G06T 7/292 |

FOREIGN PATENT DOCUMENTS

| | | | |
|---|---|---|---|
| JP | 2010-117853 | A | 5/2010 |
| JP | 2011-238028 | A | 11/2011 |
| JP | 2015-103221 | A | 6/2015 |
| JP | 2016-206736 | A | 12/2016 |
| JP | 2016-218911 | A | 12/2016 |
| JP | 2018-68618 | A | 5/2018 |
| JP | 2019-105972 | A | 6/2019 |

OTHER PUBLICATIONS

Office Action dated Jul. 7, 2020 in corresponding Japanese application No. 2019-207469; 10 pages.
Decision to Grant a Patent dated Nov. 17, 2020 in corresponding Japanese application No. 2019-207469; 5 pages.
International Search Report dated Jan. 19, 2021 in corresponding application No. PCT/JP2020/042498; 5 pgs.

* cited by examiner

SMILE DEGREE DETECTION DEVICE, METHOD, RECORDING MEDIUM, AND CAMERA SYSTEM

TECHNICAL FIELD

The present invention relates to an information processing device, an information processing method, a program, a recording medium, and a camera system that execute a procedure of distinguishing persons captured by cameras.

BACKGROUND

Technologies for distinguishing persons captured by cameras by extracting features of the faces of the persons depicted in images taken by the cameras, and by identifying images of the faces of persons who are pre-registered with a database and the extracted features of the faces with each other have been known (refer, for example, to Japanese Patent Application Laid-open No. 2003-187229). In recent years, along with advancement of image recognition technologies using AI (artificial intelligence), it is becoming possible to distinguish humans or objects with high accuracy on the basis of the images taken by the cameras.

SUMMARY

If technologies for automatically distinguishing the persons from each other on the basis of the images of the faces captured by the cameras are used, for example, for taking counts of repeated visits by customers to stores or the like (numbers of repeats), these technologies may be means for collecting marketing information. Meanwhile, facial expressions of the customers and staff members, which are depicted in the images taken by the cameras, are likely to be relevant to quality of services to be offered in the stores. In particular, there is a certain correlation between the facial expressions of the customers and the staff members in the store and the number of the repeats of the customers, and it is expected that information about the facial expressions provide knowledge that is useful in marketing. However, hitherto, collection of the information from the images of the persons captured by the cameras has not been considered. Thus, the correlation between the facial expressions of the customers and the staff members and the number of the repeats has not been effectively utilized in the marketing.

The present invention has been made in view of such circumstances, and an object thereof is to provide an information processing device, an information processing method, a program, and a recording medium that enable information that is useful in marketing to be obtained on the basis of images of the faces of persons captured by cameras installed, for example, in a store, and to provide a camera system that includes such an information processing device.

According to a first aspect of the present invention, there is provided an information processing device including:

a distinction unit that distinguishes one registered staff member of one or more registered staff members or one registered customer of one or more registered customers, the one registered staff member or the one registered customer corresponding to a captured person, the distinction being made on a basis of feature information of a feature of the captured person, the feature information including
feature information of the one or more registered staff members, and
feature information of the one or more registered customers,
on a basis of staff registration information containing the feature information of the one or more registered staff members, and
on a basis of customer registration information containing the feature information of the one or more registered customers, the feature being extracted from images which are taken by one or more cameras and which depict the captured person;

a staff-smile determination unit that determines, if the distinction unit distinguishes the one registered staff member corresponding to the captured person, whether the one registered staff member corresponding to the captured person has smiled on a basis of a smile index that indicates a smile degree of the captured person, the smile degree being calculated on a basis of the images which are taken by the one or more cameras and which depict the captured person;

a staff-smile counting unit that takes a staff smile count that is a count by which the staff-smile determination unit determines that at least ones of the one or more registered staff members have smiled in a preset time period;

a customer-revisit detection unit that detects that the one registered customer corresponding to the captured person has revisited if the distinction unit distinguishes the one registered customer corresponding to the captured person; and a customer-revisit counting unit that takes a customer revisit count that is a count by which the customer-revisit detection unit detects that at least ones of the one or more registered customers have revisited in the preset time period, in which, after the customer-revisit detection unit detects that the one registered customer corresponding to the captured person has revisited, the customer-revisit detection unit stops detecting whether the one registered customer corresponding to the captured person has revisited until a lapse of a preset interval.

According to a second aspect of the present invention, there is provided an information processing method to be implemented by one or more computers, the information processing method including:

a distinction step of distinguishing one registered staff member of one or more registered staff members or one registered customer of one or more registered customers, the one registered staff member or the one registered customer corresponding to a captured person, the distinction being made on a basis of feature information of a feature of the captured person, the feature information including
feature information of the one or more registered staff members, and
feature information of the one or more registered customers,
on a basis of staff registration information containing the feature information of the one or more registered staff members, and
on a basis of customer registration information containing the feature information of the one or more registered customers, the feature being extracted from images which are taken by one or more cameras and which depict the captured person;

a staff-smile determination step of determining, if the one registered staff member corresponding to the captured person is distinguished in the distinction step, whether the one registered staff member corresponding to the captured person has smiled on a basis of a smile index that indicates a smile degree of the captured person, the smile degree being calculated on a basis of the images which are taken by the one or more cameras and which depict the captured person;

a staff-smile counting step of taking a staff smile count that is a count by which at least ones of the one or more registered staff members are determined to have smiled in a preset time period in the staff-smile determination step;

a customer-revisit detection step of detecting that the one registered customer corresponding to the captured person has revisited if the one registered customer corresponding to the captured person is distinguished in the distinction step; and a customer-revisit counting step of taking a customer revisit count that is a count by which revisits by at least ones of the one or more registered customers in the preset time period are detected in the customer-revisit detection step, in which the customer-revisit detection step includes stopping detecting whether the one registered customer corresponding to the captured person has revisited until a lapse of a preset interval after detecting that the one registered customer corresponding to the captured person has revisited.

According to a third aspect of the present invention, there is provided a program to be executed by one or more computers, the program causing the one or more computers to carry out:

a distinction step of distinguishing one registered staff member of one or more registered staff members or one registered customer of one or more registered customers, the one registered staff member or the one registered customer corresponding to a captured person, the distinction being made
- on a basis of feature information of a feature of the captured person, the feature information including
  - feature information of the one or more registered staff members, and
  - feature information of the one or more registered customers,
- on a basis of staff registration information containing the feature information of the one or more registered staff members, and
- on a basis of customer registration information containing the feature information of the one or more registered customers, the feature being extracted from images which are taken by one or more cameras and which depict the captured person;

a staff-smile determination step of determining, if the one registered staff member corresponding to the captured person is distinguished in the distinction step, whether the one registered staff member corresponding to the captured person has smiled on a basis of a smile index that indicates a smile degree of the captured person, the smile degree being calculated on a basis of the images which are taken by the one or more cameras and which depict the captured person;

a staff-smile counting step of taking a staff smile count that is a count by which at least ones of the one or more registered staff members are determined to have smiled in a preset time period in the staff-smile determination step;

a customer-revisit detection step of detecting that the one registered customer corresponding to the captured person has revisited if the one registered customer corresponding to the captured person is distinguished in the distinction step; and a customer-revisit counting step of taking a customer revisit count that is a count by which revisits by at least ones of the one or more registered customers in the preset time period are detected in the customer-revisit detection step, in which the customer-revisit detection step includes stopping detecting whether the one registered customer corresponding to the captured person has revisited until a lapse of a preset interval after detecting that the one registered customer corresponding to the captured person has revisited.

According to a fourth aspect of the present invention, there is provided a computer-readable recording medium that records a program to be executed by one or more computers, the program causing the one or more computers to carry out:

a distinction step of distinguishing one registered staff member of one or more registered staff members or one registered customer of one or more registered customers, the one registered staff member or the one registered customer corresponding to a captured person, the distinction being made
- on a basis of feature information of a feature of the captured person, the feature information including
  - feature information of the one or more registered staff members, and
  - feature information of the one or more registered customers,
- on a basis of staff registration information containing the feature information of the one or more registered staff members, and
- on a basis of customer registration information containing the feature information of the one or more registered customers, the feature being extracted from images which are taken by one or more cameras and which depict the captured person;

a staff-smile determination step of determining, if the one registered staff member corresponding to the captured person is distinguished in the distinction step, whether the one registered staff member corresponding to the captured person has smiled on a basis of a smile index that indicates a smile degree of the captured person, the smile degree being calculated on a basis of the images which are taken by the one or more cameras and which depict the captured person;

a staff-smile counting step of taking a staff smile count that is a count by which at least ones of the one or more registered staff members are determined to have smiled in a preset time period in the staff-smile determination step;

a customer-revisit detection step of detecting that the one registered customer corresponding to the captured person has revisited if the one registered customer corresponding to the captured person is distinguished in the distinction step; and a customer-revisit counting step of taking a customer revisit count that is a count by which revisits by at least ones of the one or more registered customers in the preset time period are detected in the customer-revisit detection step, in which the customer-revisit detection step includes stopping detecting whether the one registered customer corresponding to the captured person has revisited until a lapse of a preset interval after detecting that the one registered customer corresponding to the captured person has revisited.

According to a fifth aspect of the present invention, there is provided a camera system including:

an information processing device; and the one or more cameras, the information processing device including:

a distinction unit that distinguishes one registered staff member of one or more registered staff members or one registered customer of one or more registered customers, the one registered staff member or the one registered customer corresponding to a captured person, the distinction being made on a basis of feature information of a feature of the captured person, the feature information including feature information of the one or more registered staff members, and feature information of the one or more registered customers, on a basis of staff registration information containing the feature information of the one or more registered staff members, and on a basis of customer registration information containing the feature information of the one or more registered customers, the feature being extracted from images which are taken by the one or more cameras and which depict the captured person;

a staff-smile determination unit that determines, if the distinction unit distinguishes the one registered staff member corresponding to the captured person, whether the one registered staff member corresponding to the captured person has smiled on a basis of a smile index that indicates a smile degree of the captured person, the smile degree being calculated on a basis of the images which are taken by the one or more cameras and which depict the captured person;

a staff-smile counting unit that takes a staff smile count that is a count by which the staff-smile determination unit determines that at least ones of the one or more registered staff members have smiled in a preset time period;

a customer-revisit detection unit that detects that the one registered customer corresponding to the captured person has revisited if the distinction unit distinguishes the one registered customer corresponding to the captured person; and a customer-revisit counting unit that takes a customer revisit count that is a count by which the customer-revisit detection unit detects that at least ones of the one or more registered customers have revisited in the preset time period, in which, after the customer-revisit detection unit detects that the one registered customer corresponding to the captured person has revisited, the customer-revisit detection unit stops detecting whether the one registered customer corresponding to the captured person has revisited until a lapse of a preset interval.

Advantageous Effects of Invention

The present invention enables the information that is useful in marketing to be obtained on the basis of the images of the faces of the persons captured by the cameras installed, for example, in a store.

DETAILED DESCRIPTION OF THE EMBODIMENTS

First Embodiment

Figure 1:
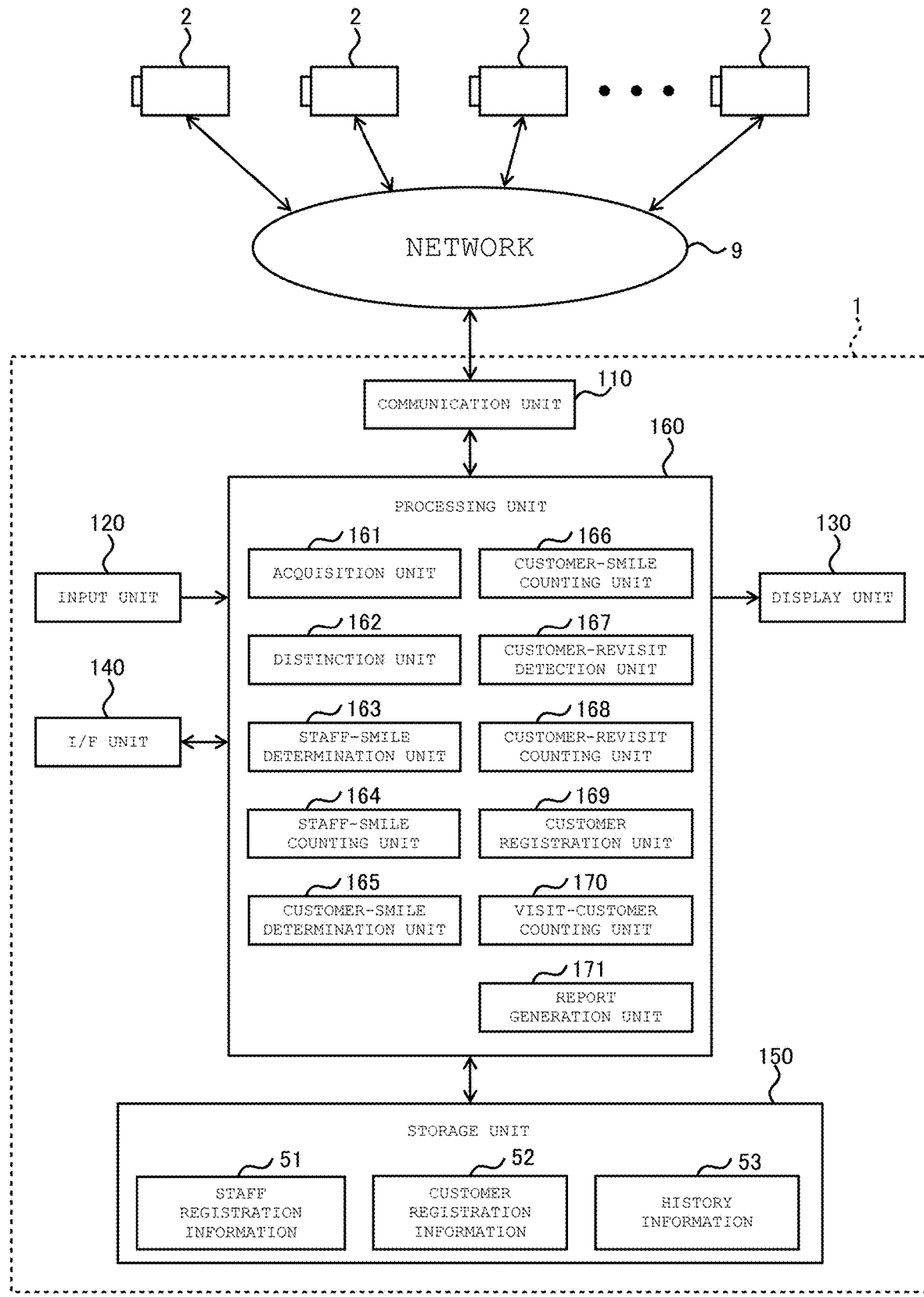
FIG. 1 is a diagram showing an example of a configuration of a camera system according to a first embodiment.

FIG. 1 is a diagram showing an example of a configuration of a camera system according to a first embodiment. The camera system shown in FIG. 1 includes a plurality of cameras 2 installed in a store or the like, and an information processing device 1 that executes processes of distinguishing persons from each other on the basis of images taken by the cameras 2. In the store or the like, the cameras 2 are installed at positions from which the person (a staff member or a customer) can be captured, and execute processes of extracting features of the person subjected to the capture (below, sometimes referred to as a "captured person") from images of the captured person (such as features of the face of the captured person). In addition, the cameras 2 also execute processes of calculating a smile index that indicates a smile degree of the captured person on the basis of images of the face of the captured person. The information processing device 1 identifies information about the features of the captured person (feature information), which is generated by the cameras 2, and other feature information of pre-registered persons (staff members and customers) with each other. In this way, the information processing device 1 executes the processes of distinguishing, from other ones of the registered targets (staff members and customers), one registered person corresponding to the captured person, and a process of taking a revisit count of the customer. In addition, the information processing device 1 executes processes of taking counts by which the staff members and the customers have smiled on the basis of the smile index calculated by the cameras 2. In the example shown in FIG. 1, the plurality of cameras 2 are connected to a network 9 such as the Internet, and the information processing device 1 acquires the information from the cameras 2 via the network 9.

[Information Processing Device 1]

In the example shown in FIG. 1, the information processing device 1 includes a communication unit 110, an input unit 120, a display unit 130, an interface unit 140, a storage unit 150, and a processing unit 160.

The communication unit 110 is a device for communicating with other devices (such as the cameras 2) via the network 9. This communication unit 110 includes devices (such as a network interface card) that perform the communication according to a predetermined communication standard such as Ethernet (trademark) or a wireless LAN.

The input unit 120 is a device for allowing instructions and information to be entered in response to operations by a user. This input unit 20 includes arbitrary input devices such as a keyboard, a mouse, a touchpad, and a touchscreen.

The display unit 130 is a device that displays images of image data to be input from the processing unit 160. Examples of this display unit 130 include a liquid crystal display and an OLED display.

The interface unit 140 is a device for allowing various data to be input to and output from the processing unit 160. This interface unit 140 includes devices with general-purpose interfaces such as USB, and a device that reads and writes the recording media (such as a memory card).

The storage unit 150 stores not only programs to be executed by a processor of the processing unit 160, but also, for example, data to be temporarily stored during processes by the processing unit 160, data to be used for the processes by the processing unit 160, and data obtained as a result of the processes by the processing unit 160. For example, the storage unit 150 stores staff registration information 51 (FIG. 2), customer registration information 52 (FIG. 3), and history information 53 (FIG. 4) described below.

The storage unit 150 is, for example, a computer-readable recording medium including main storage devices (such as a ROM and a RAM) and an auxiliary storage device (such as a flash memory, a hard disk, or an optical disk). The storage unit 150 may include a single storage device, or may include a plurality of storage devices of one or more types. The storage devices that serve as the storage unit 150 are connected to the processing unit 160 via a bus of a computer or other communication means.

The processing unit 160 comprehensively controls overall operations of the information processing device 1, and executes predetermined information processes. The processing unit 160 includes the one or more processors (such as a CPU and an MPU) that execute the processes in accordance with instruction codes of the one or more programs stored in the storage unit 150. The one or more processors of the processing unit 160 execute the one or more programs in the storage unit 150. In this way, the processing unit 160 runs as one or more computers.

Note that, the processing unit 160 may include one or more dedicated hardware modules configured to implement specific functions (such as ASICs and FPGAs). In this case, the one or more computers as the processing unit 160 may execute the processes relating to the distinction of the captured person, or the dedicated hardware modules of the processing unit 160 may execute at least ones of these processes.

As shown, for example, in FIG. 1, the processing unit 160 includes, as components that executes the processes relating to the distinction of the captured person and the determination as to whether he/she has smiled, an acquisition unit 161, a distinction unit 162, a staff-smile determination unit 163, a staff-smile counting unit 164, a customer-smile determination unit 165, a customer-smile counting unit 166, a customer-revisit detection unit 167, a customer-revisit counting unit 168, a customer registration unit 169, a visit-customer counting unit 170, and a report generation unit 171.

The acquisition unit 161 acquires various information (such as the feature information and the smile index) that is generated on the basis of the images taken by the cameras 2. The feature information is information about the features of the captured person (such as the features of the face), which are extracted from the images of the captured person. The smile index is a value that indicates the smile degree of the captured person, which is calculated on the basis of the images of the face of the captured person. In this embodiment, as an example, the feature information and the smile index are generated by the cameras 2. When the feature information and the smile index are generated by the cameras 2, the acquisition unit 161 may acquire the feature information and the smile index directly from the cameras 2, or may acquire the feature information and the smile index indirectly via one or more server devices (such as cloud servers) connected to the network 9. The feature information and the smile index to be acquired by the acquisition unit 161 may be the same as the feature information and the smile index generated by the cameras 2, or may be feature information and a smile index that are subjected to predetermined conversion, for example, by the server devices interposed between the cameras 2 and the information processing device 1.

The distinction unit 162 distinguishes, from other ones of the one or more registered staff members or other ones of the one or more registered customers, one staff member or one customer corresponding to the captured person on the basis of the feature information acquired by the acquisition unit 161 (below, sometimes referred to as "acquired feature information"), on the basis of the staff registration information 51 containing the feature information of the one or more registered staff members (below, sometimes referred to as "registered-staff feature information"), and on the basis of the customer registration information 52 containing the feature information of the one or more registered customers (below, sometimes referred to as "registered-customer feature information").

Figure 2:
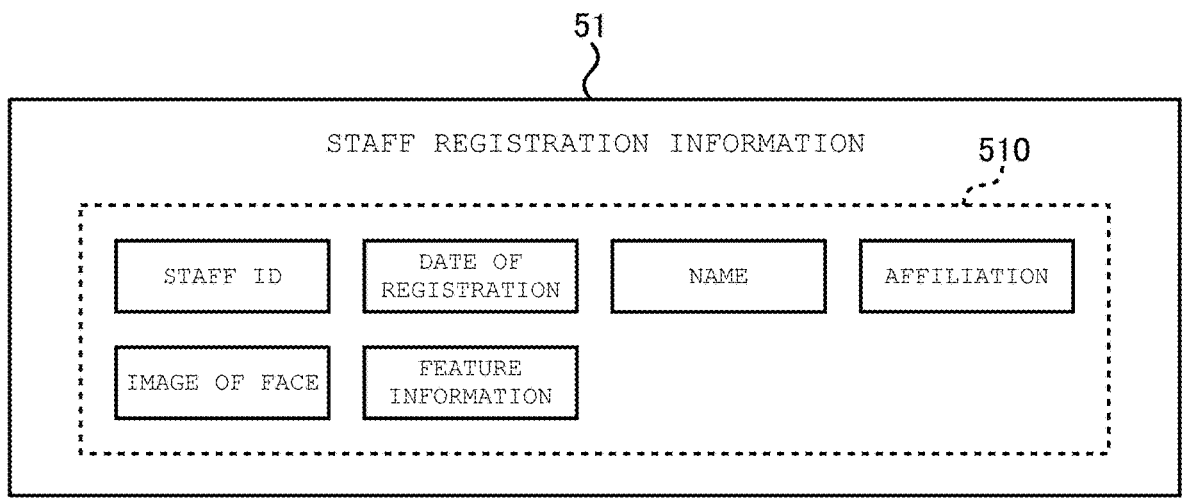
FIG. 2 is a diagram showing an example of staff registration information.

FIG. 2 is a diagram showing an example of the staff registration information 51 to be stored in the storage unit 150. The staff registration information 51 contains predetermined information about each of the registered staff members. A reference numeral 510 in FIG. 2 denotes a staff registration record that is a group of registered information items about one of the staff members. The staff registration record 510 in the example shown in FIG. 2 contains a staff ID for identifying a corresponding one of the staff members, a date and time when the registration is performed (date of registration), the name of the staff member, affiliation of the staff member (such as a division name or a store name), data of images of the face of the staff member, and the feature information indicating the features of the face of the staff member, which are extracted from the images of the face (registered-staff feature information). The registered-staff feature information is feature information that is generated in advance about each of the staff members registered with the staff registration information 51, such as information obtained by extracting the features of the staff members from the images of the staff members captured in advance. The staff registration information 51 contains the staff registration record 510 as shown in FIG. 2 about each of the one or more registered staff members.

Figure 3:
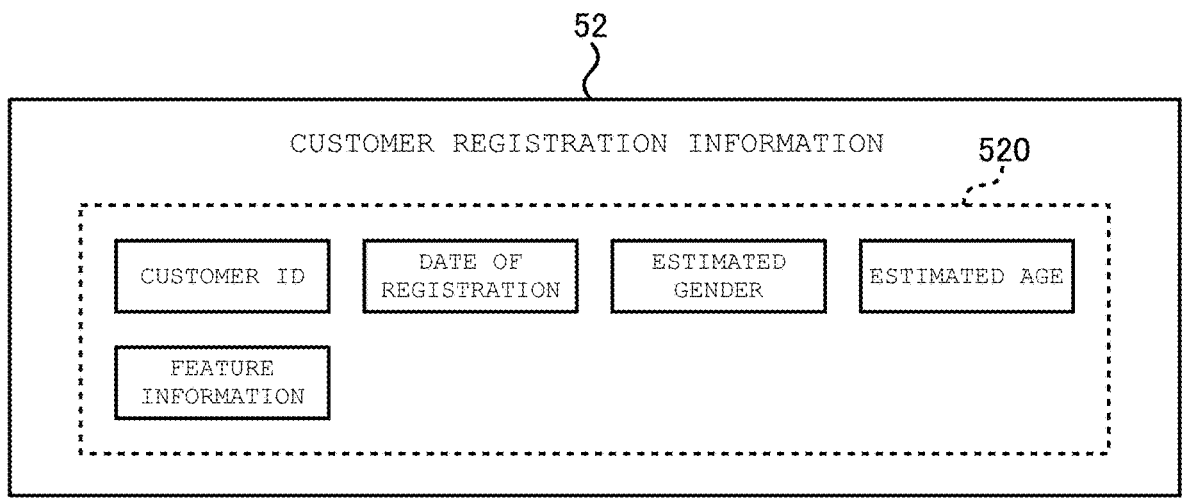
FIG. 3 is a diagram showing an example of customer registration information.

FIG. 3 is a diagram showing an example of the customer registration information 52 to be stored in the storage unit 150. In the example shown in FIG. 3, the customers to be registered with the customer registration information 52 are persons whose, for example, names are unknown. A reference numeral 520 in FIG. denotes a customer registration record that is a group of registered information items about one of the customers. The customer registration record 520 in the example shown in FIG. 3 contains a customer ID for identifying a corresponding one of the customers, a date when the registration is performed (date of registration), his/her estimated gender, estimated age, and the feature information of the captured customer (registered-customer feature information). The registered-customer feature information is feature information acquired by the acquisition unit 161 about each of the customers registered with the customer registration information 52 (acquired feature information). The customer registration information 52 contains the customer registration record 520 as shown in FIG. 3 about each of the one or more registered customers. The respective customer-registration records 520 of the customers are added to (registered with) the customer registration information 52 by the customer registration unit 169 described below.

Note that, both the "estimated gender" and the "estimated age" contained in the customer registration record 520 (FIG. 3) are estimated by the camera 2. Specifically, a processing unit 250 described below of the camera 2 estimates the gender and the age of the customer on the basis of images of a person depicted in images taken by an imaging unit 220 described below of the camera 2 (for example, on the basis of the features of the face in the images). A result of the estimation of the gender and the age is provided together with the feature information and the smile index of customer from the camera 2 to the information processing device 1. The acquisition unit 161 of the information processing device 1 acquires, together with the feature information, the result of the estimation of the gender and the age.

The distinction unit 162 identifies the registered-staff feature information contained in the staff registration information 51 and the acquired feature information with each other, and distinguishes, on the basis of a result of this identification, the registered staff member corresponding to the captured person. In addition, the distinction unit 162 identifies the registered-customer feature information contained in the customer registration information 52 and the acquired feature information with each other, and distinguishes, on the basis of a result of this identification, the customer corresponding to the captured person.

If the distinction unit 162 distinguishes the staff member corresponding to the captured person, the staff-smile determination unit 163 determines, on the basis of the smile index calculated on the basis of the images of this captured person, whether the staff member corresponding to the captured person has smiled. Specifically, if the distinction unit 162 distinguishes the staff member corresponding to the captured person, the staff-smile determination unit 163 compares the smile index calculated on the basis of the images of this captured person and a preset first threshold Th1 to each other, and determines, on the basis of a result of this comparison, whether the staff member corresponding to the captured person has smiled.

If the staff-smile determination unit 163 determines that the staff member corresponding to the captured person has smiled, the staff-smile determination unit 163 updates the history information 53 such that the history information 53 contains information about a result of the determination.

Figure 4:
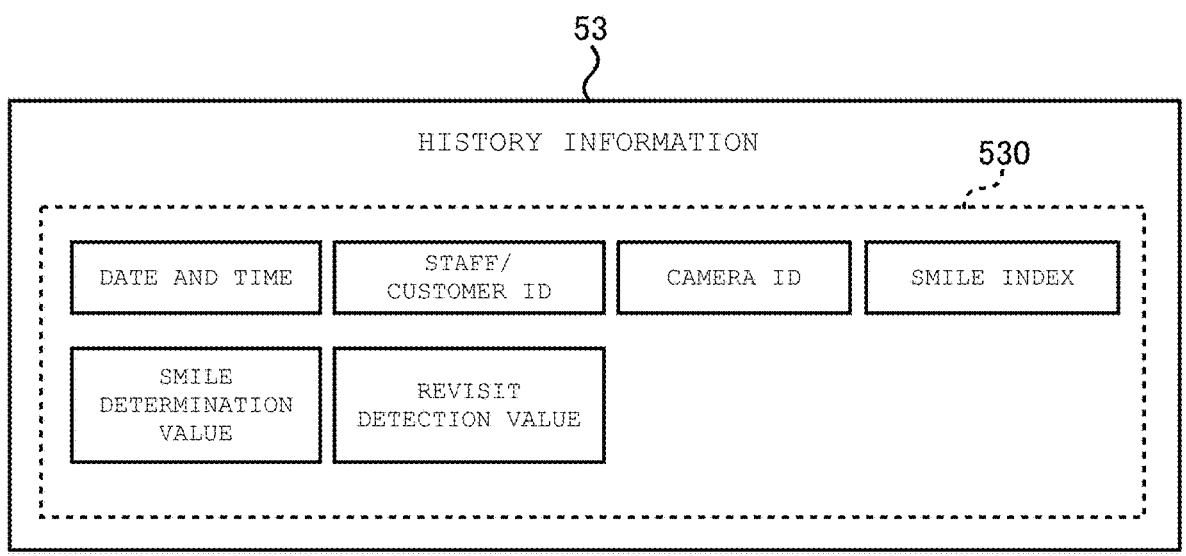
FIG. 4 is a diagram showing an example of history information.

FIG. 4 is a diagram showing an example of the history information 53 to be stored in the storage unit 150. The history information 53 contains, as information about histories, for example, the determination by the staff-smile determination unit 163 that the staff member has smiled, a determination by the customer-smile determination unit 165 described below that the customer has smiled, and detection by the customer-revisit detection unit 167 described below that the customer has revisited. A reference numeral 530 in FIG. 4 denotes a history record that is a group of information items recorded as information about one of the histories. The history record 530 in the example shown in FIG. 4 contains a date and time when the images of the captured person are taken by the cameras 2, an ID of the staff member or the customer who has been distinguished as corresponding to the captured person by the distinction unit 162 (staff ID/customer ID), a camera ID for identifying the camera 2 that has taken the images of the captured person, the smile index calculated on the basis of the images of the captured person, a smile determination value indicating the result of the determination by the staff-smile determination unit 163 or a result of the customer-smile determination unit 165 as to whether the smile has been made, and a revisit detection value indicating a result of the detection by the customer-revisit detection unit 167 as to whether the customer has revisited.

The smile determination value and the revisit detection value each take on a default value or an active value. The active value of the smile determination value indicates the smile is determined to have been made, and the default value of the smile determination value indicates that the smile is determined not to have been made. Meanwhile, the active value of the revisit detection value indicates that the revisit by the customer has been detected, and the default value of the revisit detection value indicates that the revisit by the customer has not been detected. In examples described below, the active values are "1," and the default values are "0."

If the staff-smile determination unit 163 determines that the staff member corresponding to the captured person has smiled, the staff-smile determination unit 163 generates the history record 530 as shown, for example, in FIG. 4, and adds this history record 530 to the history information 53. In this case, the staff-smile determination unit 163 sets the smile determination value to indicate that the smile is determined to have been made (sets the smile determination value to "1").

The staff-smile counting unit 164 takes a staff smile count that is a count by which the staff-smile determination unit 163 determines that at least ones of the staff members registered with the staff registration information 51 have smiled in a preset time period. For example, the staff-smile counting unit 164 extracts, from the plurality of history records 530 contained in the history information 53, history records 530 in each of which the date and time of the capture falls within the preset time period, in each of which the captured person is a staff member (which includes his/her staff ID), and in each of which the smile determination value is "1." Then, the staff-smile counting unit 164 takes a count of these extracted history records 530 as the staff smile count.

If the distinction unit 162 distinguishes one customer corresponding to the captured person from other ones of the customers registered with the customer registration information 52, the customer-revisit detection unit 167 detects that the one customer has revisited, for example, the store in which the camera 2 is installed. Note that, after the customer-revisit detection unit 167 detects that the one customer has revisited, the customer-revisit detection unit 167 stops detecting whether the one customer has revisited until a lapse of a preset interval (for example, eight hours). In other words, for each of the customers, the customer-revisit detection unit 167 presets an interval in which the customer-revisit detection unit 167 stops detecting whether revisits have been made between detection as to whether a first revisit has been made and detection as to whether a next revisit has been made. With this, erroneous detection that the customer has revisited can be prevented even every time the customer who moves, for example, in the store gets in and out of a capture range of the camera 2.

If the customer-revisit detection unit 167 detects that the customer corresponding to the captured person has revisited, for example, the store, the customer-revisit detection unit 167 generates the history record 530 as shown, for example, in FIG. 4, and adds this history record 530 to the history information 53. In this case, the customer-revisit detection unit 167 sets the revisit detection value to indicate that the revisit by the customer has been detected (sets the revisit detection value to "1").

The customer-revisit counting unit 168 takes a customer revisit count that is a count by which the customer-revisit detection unit 167 detects that at least ones of the customers registered with the customer registration information 52 have revisited in the preset time period. For example, the customer-revisit counting unit 168 extracts, from the plurality of history records 530 contained in the history information 53, other history records 530 in each of which the date and time of the capture falls within the preset time period, in each of which the captured person is a customer (which includes his/her customer ID), and in each of which the revisit detection value is "1." Then, the customer-revisit counting unit 168 takes another count of these extracted other history records 530 as the customer revisit count.

If the distinction unit 162 distinguishes the customer corresponding to the captured person, the customer-smile determination unit 165 determines, on the basis of the smile index calculated on the basis of the images of this captured person, whether the customer corresponding to the captured person has smiled. Specifically, if the distinction unit 162 distinguishes the customer corresponding to the captured person, the customer-smile determination unit 165 compares the smile index calculated on the basis of the images of this captured person and a preset second threshold Th2 to each other, and determines, on the basis of a result of this comparison, whether the customer corresponding to the captured person has smiled.

A smile degree corresponding to the first threshold Th1 in the above-described staff-smile determination unit 163 is higher than a smile degree corresponding to the second threshold Th2 in the customer-smile determination unit 165. In other words, the smile degree on the basis of which the staff-smile determination unit 163 determines that the staff member has smiled is higher than the smile degree on the basis of which the customer-smile determination unit 165 determines that the customer has smiled. Generally, it is considered that a smile degree of a normal facial expression of the staff member who is conscious of hospitality is higher than that of the customer. Thus, by setting the smile degree corresponding to the first threshold Th1 higher than the smile degree corresponding to the second threshold Th2, a risk that the normal facial expression of the staff member is determined as a smile can be reduced.

If the customer-smile determination unit 165 determines that the customer corresponding to the captured person has smiled, the customer-smile determination unit 165 generates the history record 530 as shown, for example, in FIG. 4, and adds this history record 530 to the history information 53. In this case, the customer-smile determination unit 165 sets the smile determination value to indicate that the smile is determined to have been made (sets the smile determination value to "1").

Note that, if the customer-smile determination unit 165 determines the preset number of times (for example, once) that the one of the customers has smiled in a time period of the interval in which the customer-revisit detection unit 167 stops detecting whether the one of the customers has revisited, the customer-smile determination unit 165 stops, until an end of the time period of the interval, determining whether the one of the customers has smiled. In other words, the customer-smile determination unit 165 limits a count of the determination whether the customer has smiled in the time period of the interval to a preset count or less. With this, a smile determination count described below can be prevented from reaching an abnormally high value by influence of a result of a determination as to a peculiar customer who smiles at abnormally high frequency.

The customer-smile counting unit 166 takes a customer smile count that is a count by which the customer-smile determination unit 165 determines that at least ones of the customers registered with the customer registration information 52 have smiled in the preset time period. For example, the customer-smile counting unit 166 extracts, from the plurality of history records 530 contained in the history information 53, still other history records 530 in each of which the date and time of the capture falls within the preset time period, in each of which the captured person is a customer (which includes his/her customer ID), and in each of which the smile determination value is "1." Then, the customer-smile counting unit 166 takes a still another count of these extracted still other history records 530 as the customer smile count.

If the distinction unit 162 cannot distinguish the captured person corresponding to any one of the staff members or the customers, the customer registration unit 169 adds, to the customer registration information 52, the feature information (acquired feature information) of the captured person as feature information (registered-customer feature information) of the customer to be newly registered. For example, if the distinction unit 162 cannot distinguish the captured person, the customer registration unit 169 generates a customer registration record 520 (FIG. 3) which contains the "feature information," the "estimated gender," and the "estimated age" that are acquired as to this captured person by the acquisition unit 161, and which contains a date and time when this captured person is captured as the "date of registration," and adds this customer-registration record 520 to the customer registration information 52. With this, the new customer can be automatically registered with the customer registration information 52.

The visit-customer counting unit 170 takes a visit customer count corresponding to a sum of a new-customer registration count and the customer revisit count, the new-customer registration count being a count by which the customer registration unit 169 adds, to the customer registration information 52 and in the preset time period, the feature information of the customer to be newly registered. For example, the visit-customer counting unit 170 extracts, from the plurality of customer registration records 520 contained in the customer registration information 52, customer registration records 520 in each of which the "date of registration" falls within the preset time period, and takes a count of these extracted customer-registration records 520 as the customer visit count. Then, the visit-customer counting unit 170 calculates, as the visit customer count, a sum of the taken visit-customer count and the customer revisit count taken by the customer-revisit counting unit 168.

The report generation unit 171 generates, in response to the instructions to be input by the user via the input unit 120, report information containing the staff smile count, the customer smile count, the customer revisit count, and the visit customer count described above, and displays this report information on a screen of the display unit 130.

[Camera 2]

Figure 5:
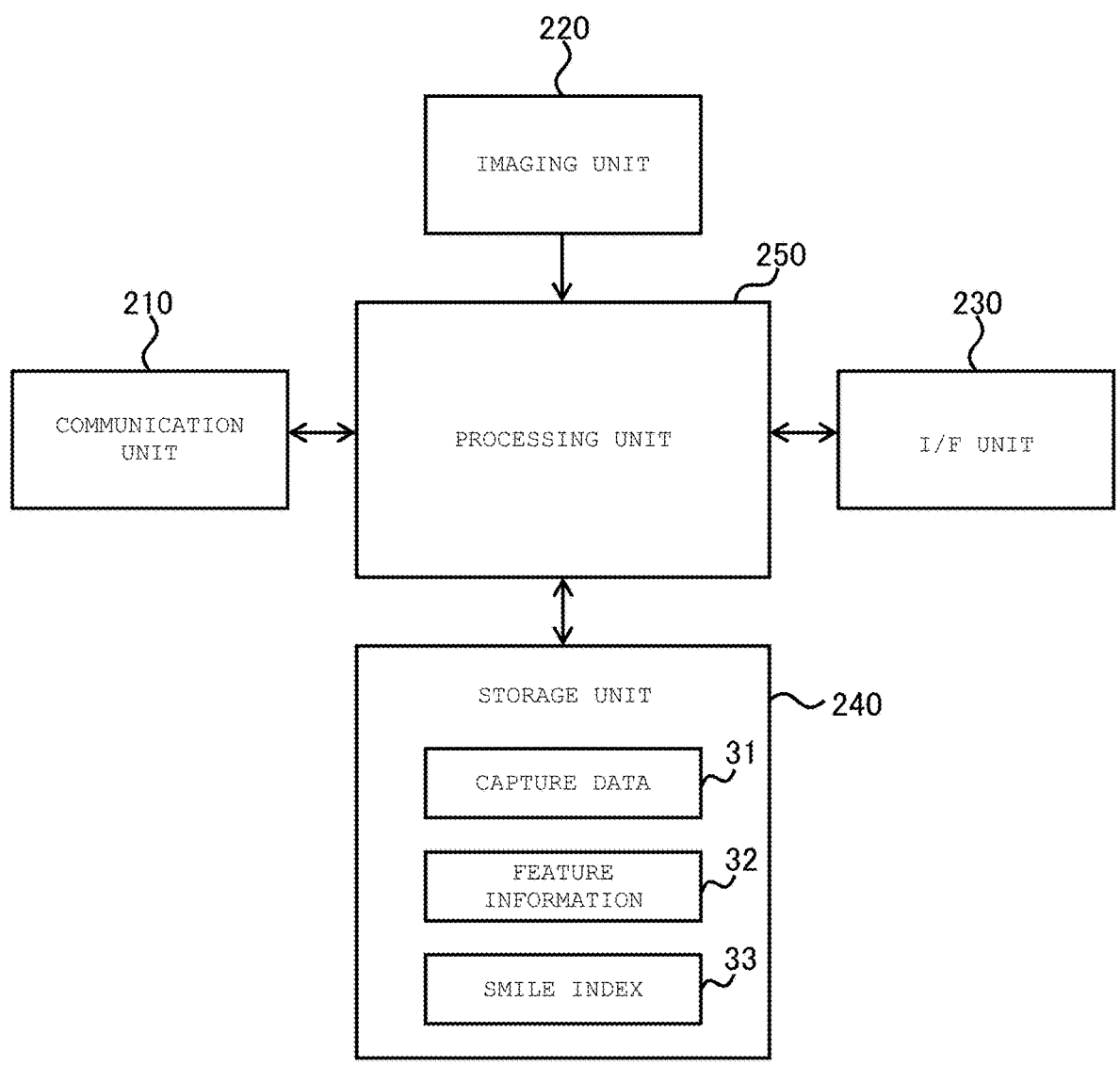
FIG. 5 is a diagram showing an example of a configuration of a camera.

FIG. 5 is a diagram showing an example of a configuration of the camera 2. The camera 2 shown in FIG. 5 includes the imaging unit 220, a communication unit 210, an interface unit 230, a storage unit 240, and the processing unit 250.

The communication unit 210 is a device for communicating with other devices (such as the information processing device 1) via the network 9. This communication unit 210 includes devices (such as the network interface card) that perform the communication according to the predetermined communication standard such as Ethernet (trademark) or the wireless LAN.

The imaging unit 220 is a device that takes images. This imaging unit 220 includes an image sensor such as a CMOS image sensor, an optical system that guides light from a captured target to the image sensor, and an image processing device that processes the images taken by the image sensor.

The interface unit 230 is a device for allowing various data to be input to and output from the processing unit 250. This interface unit 230 includes the devices with the general-purpose interfaces such as the USB, and the device that reads and writes the recording media (such as the memory card).

The storage unit 240 stores not only programs to be executed by a processor of the processing unit 250, but also, for example, data to be temporarily stored during processes by the processing unit 250, data to be used for the processes by the processing unit 250, and data obtained as a result of the processes by the processing unit 250. The storage unit 240 includes the main storage devices (such as the ROM and the RAM) and the auxiliary storage device (such as the flash memory, the hard disk, or the optical disk). The storage unit 240 may include the single storage device, or may include the plurality of storage devices of one or more types.

The processing unit 250 is a device that comprehensively controls overall operations of the camera 2. This processing unit 250 includes the one or more processors (such as the CPU and the MPU) that execute the processes in accordance with instruction codes of the one or more programs stored in the storage unit 240. The one or more processors of the processing unit 250 execute the one or more programs in the storage unit 240. In this way, the processing unit 250 runs as one or more computers. The processing unit 250 may include one or more dedicated hardware modules configured to implement the specific functions (such as the ASICs and the FPGAs). The one or more computers as the processing unit 250 may execute all the processes, or the dedicated hardware modules of the processing unit 250 may execute at least ones of these processes.

The processing unit 250 causes the imaging unit 220 to take the images (still images or moving images), and causes the storage unit 240 to store their capture data 31. In addition, the processing unit 250 extracts feature information 32 of features of a person captured by the imaging unit 220 (captured person) from the images of the captured person, and causes the storage unit 240 to store the feature information 32. For example, if features of the face of the captured person are extracted as the feature information 32, the processing unit 250 generates the feature information 32 on the basis of the features of the captured person in the images taken by the imaging unit 220, such as features of, for example, his/her eyes, nose, mouth, face, and contour. The feature information 32 may be, for example, multidimensional vectors. In this case, the distinction unit 162 may calculate, on the basis of, for example, a coefficient of a correlation between vectors indicated by the acquired feature information and vectors indicated by the registered feature information (such as registered-staff feature information and registered-customer feature information), a matching degree of the facial features indicated by these feature information items, and compare the calculated matching degree to a preset threshold. In this way, the distinction unit 162 may determine whether or not the captured person in the images and the registered persons (staff members or customers) match each other.

In addition, the processing unit 250 calculates the smile index 33 that indicates the smile degree of the captured person on the basis of the images of the face of the person captured by the imaging unit 220 (captured person). As a method for calculating the smile index 33 on the basis of the images of the face, known arbitrary methods (such as the method disclosed in Japanese Patent Application Laid-open No. 2004-46591) may be employed.

The processing unit 250 communicates with the information processing device 1 via the communication unit 210, and transmits the feature information 32 and the smile index 33 stored in the storage unit 240 as appropriate to the information processing device 1. The processing unit 250 may transmit, together with the feature information 32 and the smile index 33 to the information processing device 1, information about a date and time when the images on the basis of which the feature information 32 and the smile index 33 have been generated are taken.

Now, the operations of the information processing device 1 according to the first embodiment, which has the above-described configuration, are described.

Figure 6:
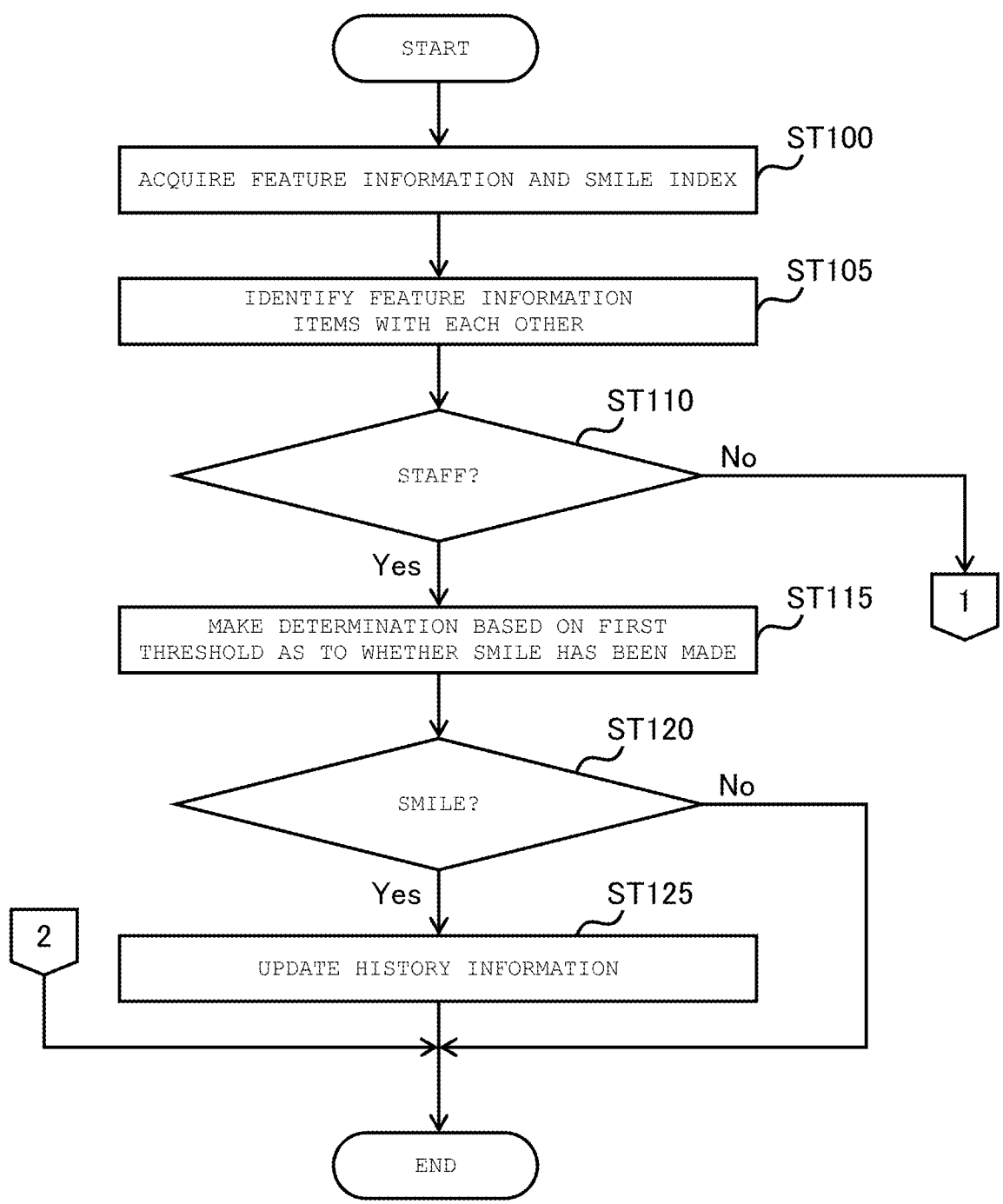
FIG. 6 is a first explanatory flowchart showing an example of a captured-person distinction procedure in an information processing device according to the first embodiment.
Figure 7:
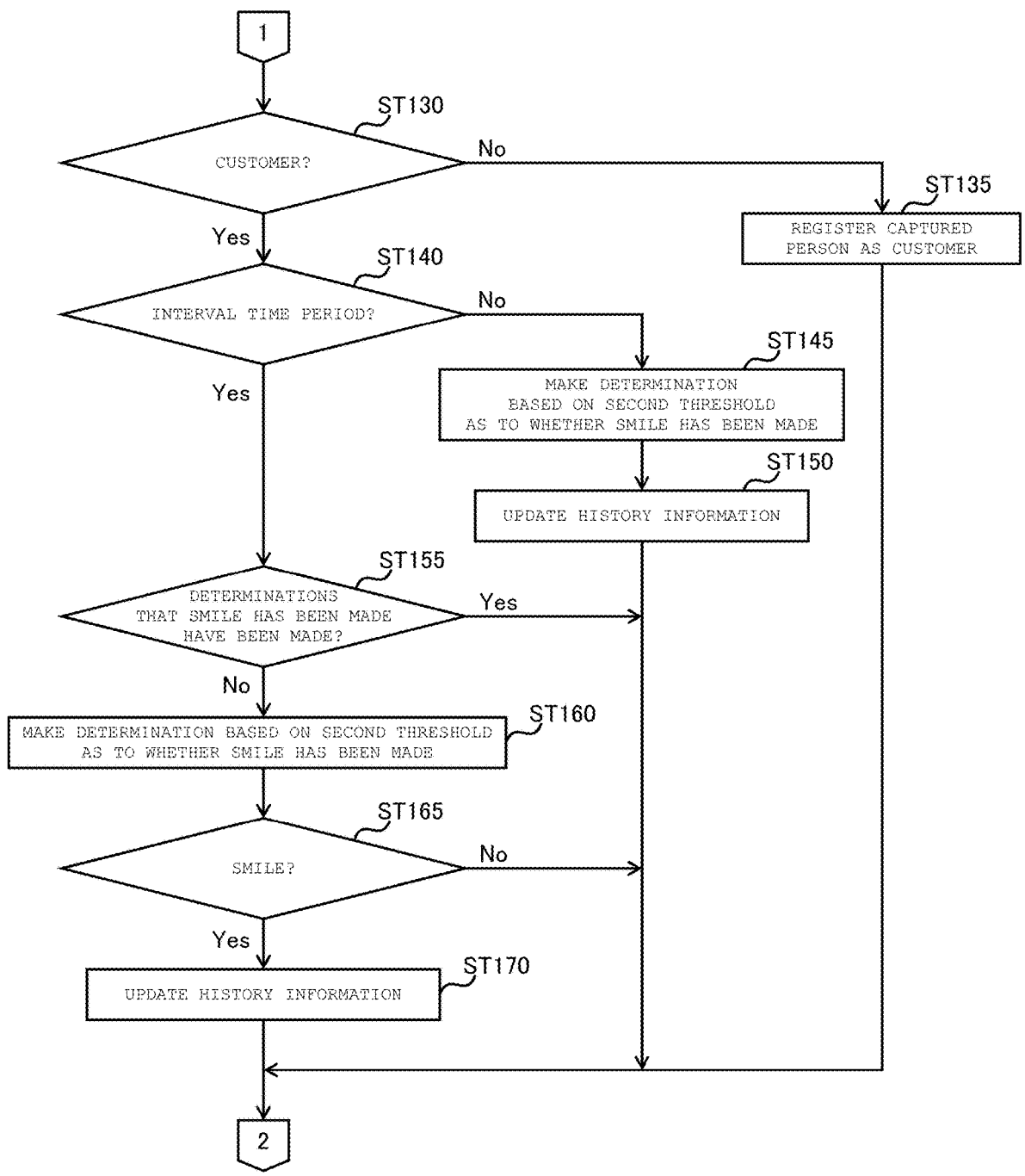
FIG. 7 is a second explanatory flowchart showing the example of the captured-person distinction procedure in the information processing device according to the first embodiment.

FIG. 6 and FIG. 7 are explanatory flowcharts showing an example of the captured-person distinction procedure in the information processing device 1 according to the first embodiment. Every time the information processing device 1 acquires the feature information and the smile index of the captured person, the information processing device 1 executes the procedure shown in the flowchart of FIG. 6 and FIG. 7.

When the acquisition unit 161 acquires the feature information (acquired featured information) and the smile index of the captured person from the camera 2 (ST100), the distinction unit 162 not only identifies the feature information of the staff members (registered-staff feature information), which is contained in the staff registration information 51, and the acquired feature information of the captured person with each other, but also identifies the feature information of the customers (registered-customer feature information), which is contained in the customer registration information 52, and the acquired feature information with each other (ST105).

It is desired that a criterion for the identification of the feature information by the distinction unit 162 be stricter than that in a case of, for example, specifying a person from images for security purposes (such as crime prevention). Specifically, it is desired that a criterion by which the acquired feature information of the captured person and the registered feature information (registered-staff feature information and registered-customer feature information) are regarded as matching each other be stricter than that in the case of, for example, specifying a person from images for the security purposes. With this, reliability of the staff smile count, the customer smile count, the customer revisit count, and the visit customer count to be obtained by processes described below can be increased. Thus, knowledge that is useful in marketing can be obtained.

If one staff member of the staff members is found to correspond to the captured person as a result of the identification of the feature information in Step ST105 (Yes in ST110), the staff-smile determination unit 163 compares the smile index of the captured person, which is acquired in Step ST100, and the first threshold Th1 to each other, and determines, on the basis of a result of this comparison, whether the one staff member corresponding to the captured person has smiled (ST115). If the staff-smile determination unit 163 determines in Step ST115 that the one staff member has smiled (Yes in ST120), the staff-smile determination unit 163 updates the history information 53 such that the history information 53 contains information about a result of this determination (ST125). Specifically, the staff-smile determination unit 163 generates a history record 530 (FIG. 4) that contains a staff ID of the one staff member who has been distinguished as corresponding to the captured person, and the smile determination value that is set to "1," and adds this history record 530 to the history information 53.

If one registered customer of the registered customers is found to correspond to the captured person as the result of the identification of the feature information in Step ST105 (No in ST110 and Yes in ST130), the customer-revisit detection unit 167 determines whether or not the one registered customer who has been distinguished as corresponding to the captured person is in the time period of the interval in which the determination as to whether a smile has been made should be stopped (ST140). For example, the customer-revisit detection unit 167 searches the history information 53 for a latest history record 530 containing a customer ID of the one registered customer who has been distinguished as corresponding to the captured person, and determines whether or not a current date and time falls within the time period of the interval of the "date and time" in the latest history record 530.

If the customer-revisit detection unit 167 determines in Step ST140 that the current date and time does not fall within the time period of the interval (No in ST140), the customer-smile determination unit 165 compares the smile index of the captured person, which is acquired in Step ST100, and the second threshold Th2 to each other, and determines, on the basis of a result of this comparison, whether the one registered customer corresponding to the captured person has smiled (ST145). In addition, in this case, the customer-revisit detection unit 167 detects that the one registered customer corresponding to the captured person has revisited, and records a result of this detection into the history information 53. Specifically, the customer-revisit detection unit 167 generates a history record 530 (FIG. 4) that contains a customer ID of the one registered customer who has been distinguished as corresponding to the captured person, the revisit detection value that is set to "1," and the smile determination value that has taken on a value in accordance with a result of the determination in Step ST145 ("1" or "0"), and adds this history record 530 to the history information 53 (ST150).

If the customer-revisit detection unit 167 determines in Step ST140 that the current date and time falls within the time period of the interval, the customer-smile determination unit 165 checks a count of the determinations that the one registered customer corresponding to the captured person has smiled in the time period of the interval (ST155). If the customer-smile determination unit 165 has determined the preset number of times (for example, once) that the one registered customer corresponding to the captured person has smiled in the time period of the interval (Yes in ST155), the procedure shown in the flowcharts is ended without carrying out Step ST160 and subsequent Steps described below.

Meanwhile, if the customer-smile determination unit 165 has determined the number of times less than the preset number of times (for example, once) that the one registered customer corresponding to the captured person has smiled in the time period of the interval (No in ST155), the procedure proceeds to Step ST160, and the customer-smile determination unit 165 determines whether the one registered customer corresponding to the captured person has smiled (ST160). Specifically, the customer-smile determination unit 165 compares the smile index of the captured person, which is acquired in Step ST100, and the second threshold Th2 to each other, and determines, on the basis of the result of this comparison, whether the one registered customer corresponding to the captured person has smiled. If the customer-smile determination unit 165 determines in Step ST160 that the one registered customer has smiled (Yes in ST165), the customer-smile determination unit 165 updates the history information 53 such that the history information 53 contains information about a result of this determination (ST170). Specifically, the customer-smile determination unit 165 generates the history record 530 (FIG. 4) that contains the customer ID of the one registered customer who has been distinguished as corresponding to the captured person, and the smile determination value that is set to "1," and adds this history record 530 to the history information 53.

If none of the registered staff members and the registered customers is found to correspond to the captured person as the result of the identification of the feature information in Step ST105 (No in ST110 and No in ST130), the customer registration unit 169 adds, to the customer registration information 52, the feature information (acquired feature information) of the captured person as the feature information (registered-customer feature information) of the customer to be newly registered. For example, the customer registration unit 169 generates a customer registration record 520 (FIG. 3) which contains the "feature information," the "estimated gender," and the "estimated age" that are acquired as to this captured person by the acquisition unit 161, and which contains a date and time when this captured person is captured as the "date of registration," and adds this customer-registration record 520 to the customer registration information 52.

Figure 8:
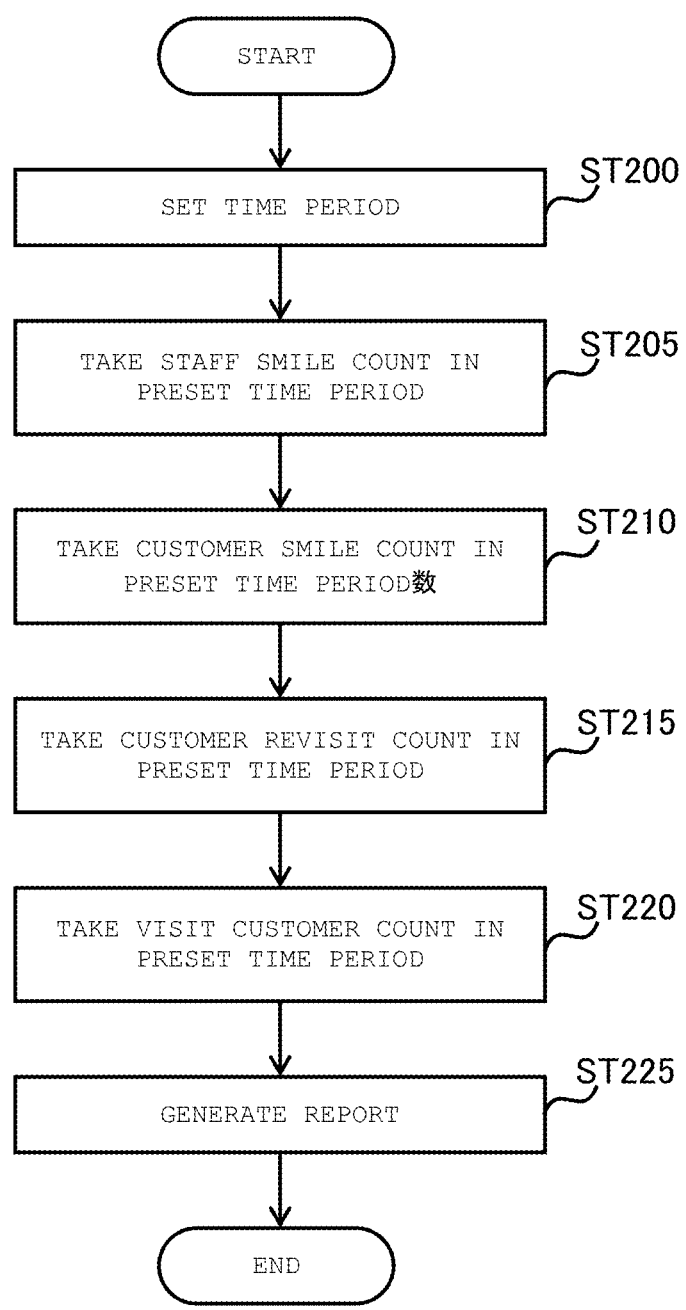
FIG. 8 is an explanatory flowchart showing an example of a report generation procedure in the information processing device according to the first embodiment.

FIG. 8 is an explanatory flowchart showing an example of a report generation procedure in the information processing device 1 according to the first embodiment.

If an instruction to request the generation of the report information is input by the user via the input unit 120, the report generation unit 171 causes the display unit 130 to display a setting screen for setting a time period as to which the report information is generated. From this setting screen, setting values of the time period (such as a start date and time and an end date and time of the time period) are entered into the report generation unit 171 via the input unit 120 (ST200).

If the setting values of the time period are entered, the staff-smile counting unit 164 takes the staff smile count by which the staff-smile determination unit 163 determines that at least ones of the staff members (for example, all the staff members) registered with the staff registration information 51 have smiled in the preset time period that is set on the basis of the setting values (ST205). For example, the staff-smile counting unit 164 extracts, from the plurality of history records 530 contained in the history information 53, the history records 530 in each of which the date and time of the capture falls within the preset time period, in each of which the captured person is a staff member (which includes his/her staff ID), and in each of which the smile determination value is "1." Then, the staff-smile counting unit 164 takes the count of these extracted history records 530 as the staff smile count.

Further, the customer-smile counting unit 166 takes the customer smile count by which the customer-smile determination unit 165 determines that at least ones of the customers (for example, all the customers) registered with the customer registration information 52 have smiled in the preset time period (ST210). For example, the customer-smile counting unit 166 extracts, from the plurality of history records 530 contained in the history information 53, the still other history records 530 in each of which the date and time of the capture falls within the preset time period, in each of which the captured person is a customer (which includes his/her customer ID), and in each of which the smile determination value is "1." Then, the customer-smile counting unit 166 takes the still another count of these extracted still other history records 530 as the staff smile count.

Still further, the customer-revisit counting unit 168 takes the customer revisit count by which the customer-revisit detection unit 167 detects that at least ones of the customers (for example, all the customers) registered with the customer registration information 52 have revisited in the preset time period (ST215). For example, the customer-revisit counting unit 168 extracts, from the plurality of history records 530 contained in the history information 53, the other history records 530 in each of which the date and time of the capture falls within the preset time period, in each of which the captured person is a customer (which includes his/her customer ID), and in each of which the revisit detection value is "1." Then, the customer-revisit counting unit 168 takes the other count of these extracted other history records 530 as the customer revisit count.

Yet further, the visit-customer counting unit 170 takes the visit customer count corresponding to the sum of the customer revisit count and the new-customer registration count by which the customer registration unit 169 adds, to the customer registration information 52 and in the preset time period, the feature information of the customer to be newly registered (ST220). For example, the visit-customer counting unit 170 extracts, from the customer registration information 52 (FIG. 3), the customer registration records 520 in each of which the "date of registration" falls within the preset time period, and takes the count these extracted customer-registration records 520 as the customer visit count. Then, the visit-customer counting unit 170 calculates, as the visit customer count, the sum of the taken visit-customer count and the customer revisit count (ST215).

The report generation unit 171 generates the report information that contains the staff smile count taken in Step ST205 (for example, a sum of smile determination counts of all the staff members), the customer smile count taken in Step ST210 (for example, a sum of smile determination counts of the previous customers), the customer revisit count taken in Step ST215 (for example, a sum of revisit counts of all the customers), and the visit customer count taken in Step ST220 (ST225). Specifically, the report generation unit 171 displays the generated report information on the screen of the display unit 130. Note that, the report generation unit 171 may acquire information about sales of a store in the preset period from, for example, a device (such as database) (not shown), and may contain the acquired sales information in the report information.

Note that, if the time period as to which the report information is generated is preset before this time period, the report generation unit 171 may omit the process of setting the time period in Step ST200. In this case, the report generation unit 171 may control the counting units (staff-smile counting unit 164, customer-smile counting unit 166, customer-revisit counting unit 168, and visit-customer counting unit 170) such that the process of Step ST205 and subsequent Steps are automatically carried out after a lapse of the time period as to which the report information is generated.

In addition, the report generation unit 171 may provide the generated report information to another device (such as a terminal device of the user who wants to view the report information) by arbitrary means (such as e-mail).

As described above, according to this embodiment, on the basis of the feature information and the smile index of the captured person, which are obtained on the basis of the images of the captured person captured by the one or more cameras 2 installed, for example, in a store, the count by which the registered staff member corresponding to the captured person is determined to have smiled (staff smile count) is taken, and the count by which the registered customer corresponding to the captured person revisits, for example, the store (customer revisit count) is taken. With this, a correlation between the smile count of the staff member and the revisit count of the customer in, for example, the store in which the cameras 2 are installed can be clearly grasped. Thus, knowledge that is useful in marketing can be obtained.

According to this embodiment, after it is detected that one customer of the customers has revisited, the detection as to whether the one customer has revisited is stopped until the lapse of the preset interval (for example, eight hours). With this, the erroneous detection that the one customer has revisited can be advantageously prevented even every time the one customer who moves, for example, in the store gets in and out of the capture ranges of the cameras 2.

According to this embodiment, on the basis of the feature information and the smile index of the captured person, the count by which the registered customer corresponding to the captured person is determined to have smiled (customer smile count) is taken. With this, a correlation between the smile count of the staff member, the smile count of the customer, and the revisit count of the customer in, for example, the store in which the cameras 2 are installed can be clearly grasped. Thus, knowledge that is further useful in marketing can be obtained.

According to this embodiment, the smile degree corresponding to the first threshold Th1 to be used in the staff smile determination is higher than the smile degree corresponding to the second threshold Th2 to be used in the customer smile determination. Thus, the risk that the normal facial expression of the staff member, which is liable to be higher in smile degree than that of the customer, is determined as a smile can be advantageously reduced.

According to this embodiment, if it is determined the preset number of times (for example, once) that the one customer of the customers has smiled in the time period of the interval in which the detection as to whether the one customer has revisited is stopped, the determination as to whether the one customer has smiled is stopped until the end of the time period of the interval. With this, the smile determination count can be advantageously prevented from reaching the abnormally high value by the influence of the result of the determination as to the peculiar customer who smiles at the abnormally high frequency.

Second Embodiment

Next, the information processing device 1 according to a second embodiment is described. A configuration of the information processing device 1 according to the second embodiment is substantially the same as that of the information processing device 1 according to the first embodiment except some of operations of the processing unit 160 (specifically, the operation of the staff-smile determination unit 163). Below, the difference from the information processing device 1 according to the first embodiment (specifically, difference of the operation of the staff-smile determination unit 163) is mainly described.

If the distinction unit 162 distinguishes the staff member corresponding to the captured person as in the first embodiment, the staff-smile determination unit 163 of the second embodiment determines, on the basis of the smile index calculated on the basis of the images of this captured person, whether this staff member corresponding to the captured person has smiled. Note that, the staff-smile determination unit 163 of the second embodiment determines, in a customer-stay time period in which the distinction unit 162 has distinguished an at least one customer corresponding to the captured person, whether the staff member corresponding to another captured person has smiled. In other words, out of the customer-stay time period, the staff-smile determination unit 163 of the second embodiment does not determine whether the staff member corresponding to the captured person has smiled.

Figure 9:
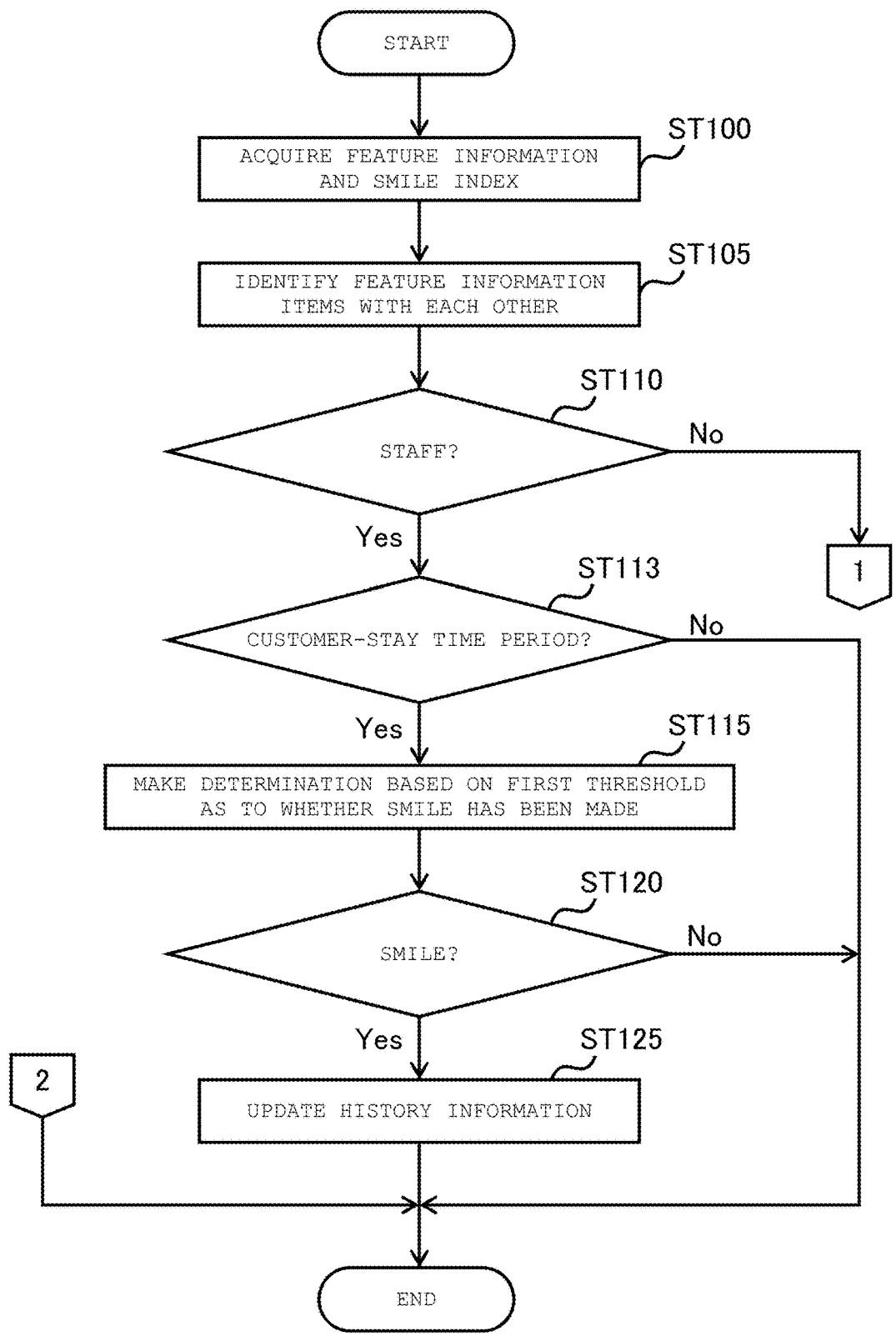
FIG. 9 is a first explanatory flowchart showing another example of the captured-person distinction procedure in the information processing device according to a second embodiment.
Figure 10:
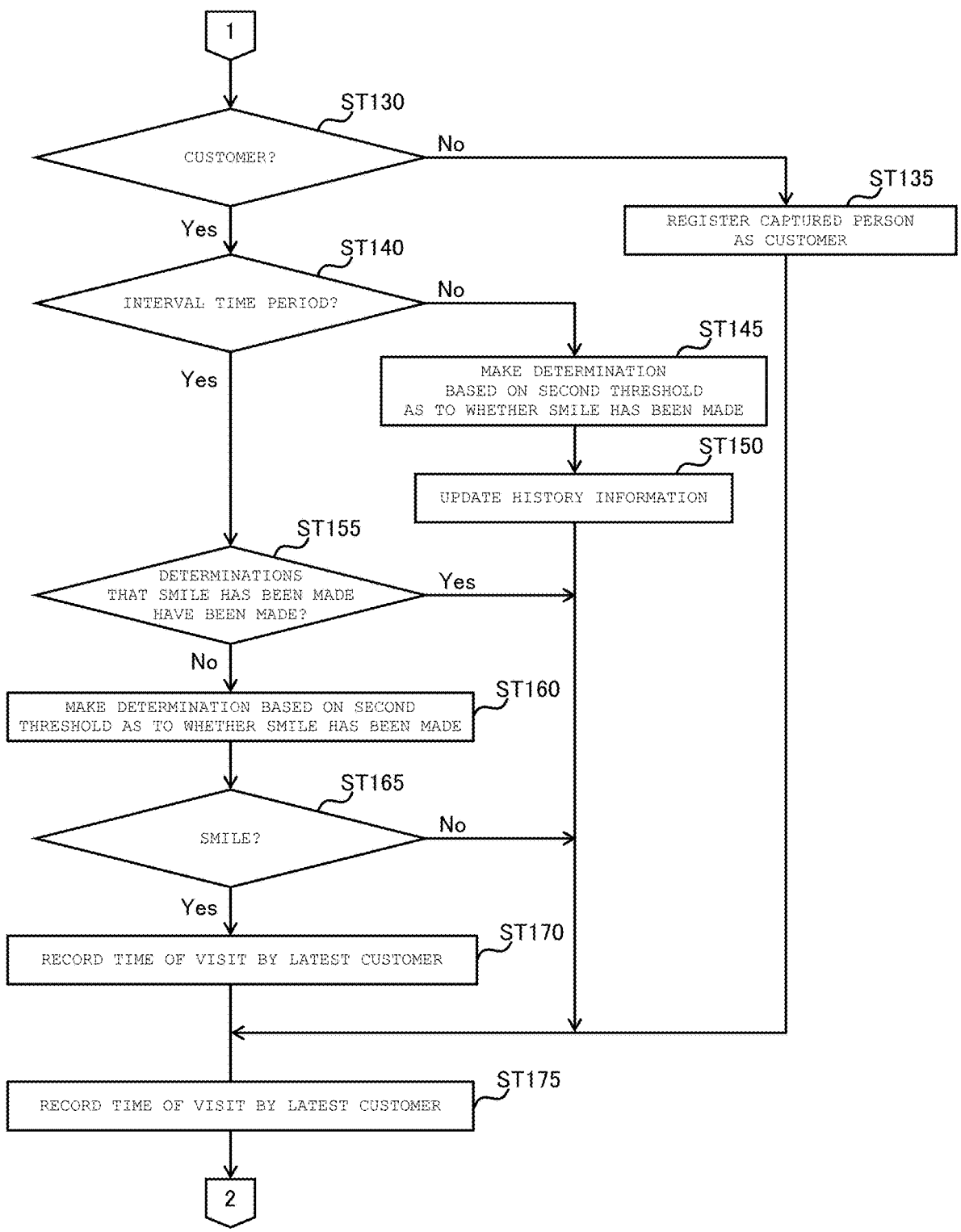
FIG. 10 is a second explanatory flowchart showing the other example of the captured-person distinction procedure in the information processing device according to the second embodiment.

FIG. 9 and FIG. 10 are explanatory showing flowcharts showing another example of the captured-person distinction procedure in the information processing device 1 according to the second embodiment. The flowchart shown in FIG. 9 is different from the flowchart shown in FIG. 6 in further including Step ST113, and the flowchart shown in FIG. 10 is different from the flowchart shown in FIG. 7 in further including Step ST175.

If the result of the identification of the feature information in Step ST105 demonstrates that a person corresponding to the captured person is a customer (No in ST110), the staff-smile determination unit 163 stores information about a time of a visit by this latest customer (such as information about a time when the captured person who is the customer is captured) into the storage unit 150 (ST175). Then, if one of the registered customers is found to correspond to the other captured person by the identification of the feature information in Step ST105 (Yes in ST110), the staff-smile determination unit 163 calculates an elapsed time period from the time of the visit by the latest customer, which is stored into the storage unit 150 in Step ST175, and compares the calculated elapsed time period and an average customer-stay time period (for example, fifteen minutes) to each other. With this, the staff-smile determination unit 163 determines whether or not the elapsed time period falls within the customer-stay time period (ST113). Specifically, if the elapsed time period from the time of the visit by the latest customer is shorter than the average customer-stay time period, the staff-smile determination unit 163 determines that the elapsed time period falls within the customer-stay time period, and if this elapsed time period is longer than the customer-stay time period, the staff-smile determination unit 163 determines that the elapsed time period does not fall within the customer-stay time period. If the staff-smile determination unit 163 determines that the elapsed time period falls within the customer-stay time period (Yes in ST113), the staff-smile determination unit 163 executes the above-described processes of Step ST115 and subsequent Steps. Meanwhile, if the staff-smile determination unit 163 determines that the elapsed time period does not fall within the customer-stay time period (No in ST113), the staff-smile determination unit 163 does not execute the processes of Step ST115 and subsequent Steps, and the procedure shown in the flowchart is ended.

As described above, according to this embodiment, in the customer-stay time period in which an at least one of the customers is distinguished as corresponding to the captured person, the determination as to whether the staff member corresponding to the other captured person has smiled is made. With this, smiles of the staff members in a time period in which no customers are highly likely to stay are excluded from the staff smile count. Thus, the correlation between the staff smile count and the customer revisit count, and the correlation between the staff smile count and the customer smile count can be further accurately grasped.

Note that, the present invention is not limited only to the above-described embodiments, and may include other variations.

For example, although the features of the face of the person depicted in the images taken by the camera 2 are extracted as the feature information in the examples of the above-described embodiments, features of arbitrary body parts other than the face may be extracted as the feature information, or features of an entirety of the body may be extracted as the feature information.

Further, although the camera 2 generates the feature information and the smile index of the captured person in the examples of the above-described embodiments, the present invention is not limited to these examples. As other embodiments of the present invention, devices other than the camera 2 (such as the information processing device 1 and arbitrary server devices that are connected to the network 9) may generate the feature information and the smile index of the captured person on the basis of the images taken by the camera 2.

In summary, the customers may be registered or may be unregistered (unknown). The staff members are registered.

The smile thresholds of the staff members and the customers are unequal to each other (for example, staff members>customers), and smiles of a single customer are not detected a plurality of times in a certain interval. Reactions of the customer to smiles of a certain one of the staff members are detected as the smiles. (Smiles of the certain one of the staff members and the smiles of the customer are linked to each other.)

Effect of the smiles of the staff member can be converted to scores. If the interval is set to a predetermined time period (for example, one hour), and a customer X smiles several times in response to smiles of a staff member A in this one hour, the staff member A gets a score. Then, if a staff member B makes the customer X smile several times after the one hour, the staff member B gets a score of one. If both the staff members A and B make the customer X smile in the interval of the one hour, of these staff members, either one who makes the customer X smile first gets the score.

The invention claimed is:

1. An information processing device, comprising:
a distinction unit that distinguishes one registered staff member of one or more registered staff members or one registered customer of one or more registered customers, the one registered staff member or the one registered customer corresponding to a captured person, the distinction being made on a basis of feature information of a feature of the captured person, the feature information including feature information of the one or more registered staff members, and feature information of the one or more registered customers, on a basis of staff registration information containing the feature information of the one or more registered staff members, and on a basis of customer registration information containing the feature information of the one or more registered customers, the feature being extracted from images which are taken by one or more cameras and which depict the captured person;

a staff-smile determination unit that determines, when the distinction unit distinguishes the one registered staff member corresponding to the captured person, whether the one registered staff member corresponding to the captured person has smiled on a basis of a staff smile index that indicates a smile degree of the captured person, the smile degree being calculated on a basis of the images which are taken by the one or more cameras and which depict the captured person, and compares the calculated staff smile index to a first threshold;

a staff-smile counting unit that takes a staff smile count by which the staff-smile determination unit determines that at least one of the one or more registered staff members have smiled in a preset time period;

a customer-revisit detection unit that detects that the one registered customer corresponding to the captured person has revisited when the distinction unit distinguishes the one registered customer corresponding to the captured person;

a customer-revisit counting unit that takes a customer revisit count by which the customer-revisit detection unit detects that at least one of the one or more registered customers have revisited in the preset time period;

a customer-smile determination unit that determines, when the distinction unit distinguishes the one registered customer corresponding to the captured person, whether the one registered customer corresponding to the captured person has smiled on the basis of a customer smile index calculated on the basis of the images which are taken by the one or more cameras and which depict the captured person and compares the calculated customer smile index to a second threshold, wherein a smile degree corresponding to the first threshold is higher than a smile degree corresponding to the second threshold; and a customer-smile counting unit that takes a customer smile count by which the customer-smile determination unit determines that the at least one of the one or more registered customers have smiled in the preset time period, wherein, after the customer-revisit detection unit detects that the one registered customer corresponding to the captured person has revisited, the customer-revisit detection unit stops detecting whether the one registered customer corresponding to the captured person has revisited until a lapse of a preset interval.

2. The information processing device according to claim 1, wherein, when the distinction unit distinguishes the one registered customer corresponding to the captured person, the staff-smile determination unit:

determines, on a basis of a result of the comparison between the staff smile index and the first threshold, whether the one registered staff member corresponding to the captured person has smiled, wherein, when the distinction unit distinguishes the one registered customer corresponding to the captured person, the customer-smile determination unit, and determines, on a basis of a result of the comparison between the customer smile index and the second threshold, whether the one registered customer corresponding to the captured person has smiled.

3. The information processing device according to claim 1, wherein, when the customer-revisit detection unit determines a preset number of times that the one registered customer corresponding to the captured person has smiled in a time period of the preset interval in which the customer-revisit detection unit has stopped detecting whether the one registered customer corresponding to the captured person has revisited, the customer-smile determination unit stops, until an end of the time period of the preset interval, determining whether the one registered customer corresponding to the captured person has smiled.

4. The information processing device according to claim 1, wherein the staff-smile determination unit determines, in a customer-stay time period in which the distinction unit has distinguished at least one registered customer corresponding to the captured person from the one or more registered customers, whether the one registered staff member corresponding to the captured person has smiled.

5. The information processing device according to claim 1, further comprising:

a customer registration unit that adds, to the customer registration information, the feature information of the captured person whom the distinction unit cannot distinguish as corresponding to the one registered staff member or the one registered customer as feature information of the one registered customer to be newly registered.

6. The information processing device according to claim 5, further comprising:

a visit-customer counting unit that takes a visit customer count corresponding to a sum of a new-customer registration count and the customer revisit count, wherein the customer registration unit adds, to the customer registration information, feature information of the one registered customer to be newly registered in the preset time period.

7. An information processing method implemented by one or more computers, the information processing method comprising:

distinguishing one registered staff member of one or more registered staff members or one registered customer of one or more registered customers, the one registered staff member or the one registered customer corresponding to a captured person, the distinction being made on a basis of feature information of a feature of the captured person, the feature information including feature information of the one or more registered staff members, and feature information of the one or more registered customers, on a basis of staff registration information containing the feature information of the one or more registered staff members, and on a basis of customer registration information containing the feature information of the one or more registered customers, the feature being extracted from images which are taken by one or more cameras and which depict the captured person;

determining, when the one registered staff member corresponding to the captured person is distinguished in the distinction step, whether the one registered staff member corresponding to the captured person has smiled on a basis of a staff smile index that indicates a smile degree of the captured person, the smile degree being calculated on a basis of the images which are taken by the one or more cameras and which depict the captured person;

comparing the calculated staff smile index to a first threshold;

taking a staff smile count of at least one of the one or more registered staff members are determined to have smiled in a preset time period in the staff-smile determination step;

detecting that the one registered customer corresponding to the captured person has revisited when the one registered customer corresponding to the captured person is distinguished in the distinction step;

taking a customer revisit count by at least one of the one or more registered customers in the preset time period detected in the customer-revisit detection step;

determining, when the one registered customer corresponding to the captured person is distinguished in the distinction step, whether the one registered customer corresponding to the captured person has smiled on the basis of a customer smile index calculated on the basis of the images which are taken by the one or more cameras and which depict the captured person;

comparing the calculated customer smile index to a second threshold, wherein a smile degree corresponding to the first threshold is higher than a smile degree corresponding to the second threshold; and taking a customer smile count of at least one of the one or more registered customers are determined to have smiled in the preset time period in the customer-smile determination step, wherein the customer-revisit detection step includes stopping detecting whether the one registered customer corresponding to the captured person has revisited until a lapse of a preset interval after detecting that the one registered customer corresponding to the captured person has revisited.

8. A non-transitory computer-readable recording medium that records a program to be executed by one or more computers, the program causing the one or more computers to carry out:

distinguishing one registered staff member of one or more registered staff members or one registered customer of one or more registered customers, the one registered staff member or the one registered customer corresponding to a captured person, the distinction being made on a basis of feature information of a feature of the captured person, the feature information including feature information of the one or more registered staff members, and feature information of the one or more registered customers, on a basis of staff registration information containing the feature information of the one or more registered staff members, and on a basis of customer registration information containing the feature information of the one or more registered customers, the feature being extracted from images which are taken by one or more cameras and which depict the captured person;

determining, when the one registered staff member corresponding to the captured person is distinguished in the distinction step, whether the one registered staff member corresponding to the captured person has smiled on a basis of a staff smile index that indicates a smile degree of the captured person, the smile degree being calculated on a basis of the images which are taken by the one or more cameras and which depict the captured person;

comparing the calculated staff smile index to a first threshold;

taking a staff smile count of at least one of the one or more registered staff members determined to have smiled in a preset time period in the staff-smile determination step;

detecting that the one registered customer corresponding to the captured person has revisited when the one registered customer corresponding to the captured person is distinguished in the distinction step;

taking a customer revisit count by at least one of the one or more registered customers in the preset time period are detected in the customer-revisit detection step;

determining, when the one registered customer corresponding to the captured person is distinguished in the distinction step, whether the one registered customer corresponding to the captured person has smiled on the basis of a customer smile index calculated on the basis of the images which are taken by the one or more cameras and which depict the captured person;

comparing the calculated customer smile index to a second threshold, wherein a smile degree corresponding to the first threshold is higher than a smile degree corresponding to the second threshold; and taking a customer smile count of at least one of the one or more registered customers determined to have smiled in the preset time period in the customer-smile determination step, wherein the customer-revisit detection step includes stopping detecting whether the one registered customer corresponding to the captured person has revisited until a lapse of a preset interval after detecting that the one registered customer corresponding to the captured person has revisited.

9. A camera system, comprising:

an information processing device; and the one or more cameras, the information processing device including:

a distinction unit that distinguishes one registered staff member of one or more registered staff members or one registered customer of one or more registered customers, the one registered staff member or the one registered customer corresponding to a captured person, the distinction being made on a basis of feature information of a feature of the captured person, the feature information including feature information of the one or more registered staff members, and feature information of the one or more registered customers, on a basis of staff registration information containing the feature information of the one or more registered staff members, and on a basis of customer registration information containing the feature information of the one or more registered customers, the feature being extracted from images which are taken by one or more cameras and which depict the captured person;

a staff-smile determination unit that determines, when the distinction unit distinguishes the one registered staff member corresponding to the captured person, whether the one registered staff member corresponding to the captured person has smiled on a basis of a staff smile index that indicates a smile degree of the captured person, the smile degree being calculated on a basis of the images which are taken by the one or more cameras and which depict the captured person and compares the calculated staff smile index to a first threshold;

a staff-smile counting unit that takes a staff smile count by which the staff-smile determination unit determines that at least one of the one or more registered staff members have smiled in a preset time period;
a customer-revisit detection unit that detects that the one registered customer corresponding to the captured person has revisited when the distinction unit distinguishes the one registered customer corresponding to the captured person;
a customer-revisit counting unit that takes a customer revisit count by which the customer-revisit detection unit detects that at least one of the one or more registered customers have revisited in the preset time period;
a customer-smile determination unit that determines, when the distinction unit distinguishes the one registered customer corresponding to the captured person, whether the one registered customer corresponding to the captured person has smiled on the basis of a customer smile index calculated on the basis of the images which are taken by the one or more cameras and which depict the captured person and compares the calculated customer smile index to a second threshold; and
a customer-smile counting unit that takes a customer smile count by which the customer-smile determination unit determines that the at least one of the one or more registered customers have smiled in the preset time period, wherein, after the customer-revisit detection unit detects that the one registered customer corresponding to the captured person has revisited, the customer-revisit detection unit stops detecting whether the one registered customer corresponding to the captured person has revisited until a lapse of a preset interval.

* * * * *